United States Patent
Yonemura et al.

(10) Patent No.: US 9,298,047 B2
(45) Date of Patent: Mar. 29, 2016

(54) LIQUID CRYSTAL DISPLAY PANEL

(71) Applicant: MITSUBISHI ELECTRIC CORPORATION, Tokyo (JP)

(72) Inventors: Koji Yonemura, Tokyo (JP); Shingo Nagano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 192 days.

(21) Appl. No.: 14/072,383

(22) Filed: Nov. 5, 2013

(65) Prior Publication Data

US 2014/0160401 A1 Jun. 12, 2014

(30) Foreign Application Priority Data

Dec. 12, 2012 (JP) ................................ 2012-271191

(51) Int. Cl.
*G02F 1/1335* (2006.01)
*G02F 1/1362* (2006.01)
*G02F 1/1343* (2006.01)
*G02F 1/1337* (2006.01)

(52) U.S. Cl.
CPC .... *G02F 1/134309* (2013.01); *G02F 1/133512* (2013.01); *G02F 1/136209* (2013.01); *G02F 1/136286* (2013.01); *G02F 1/133707* (2013.01); *G02F 2001/133757* (2013.01); *G02F 2001/134372* (2013.01); *G02F 2201/40* (2013.01)

(58) Field of Classification Search
CPC .............. G02F 1/133707; G02F 2001/134372; G02F 1/133512; G02F 1/136209
USPC .......................................................... 349/110
See application file for complete search history.

(56) References Cited

U.S. PATENT DOCUMENTS 6,747,712 B2 6/2004 Noh et al.
8,228,478 B2 7/2012 Maede et al.
(Continued)

FOREIGN PATENT DOCUMENTS

| CN | 101539701 A | 9/2009 |
|---|---|---|
| CN | 102004360 A | 4/2011 |
| JP | 2003-021845 A | 1/2003 |
| JP | 2007-293154 A | 11/2007 |
| JP | 2009-223245 A | 10/2009 |
| JP | 2010-217635 A | 9/2010 |

OTHER PUBLICATIONS

The First Chinese Office Action issued by the Chinese Patent Office on Dec. 3, 2015, which corresponds to Chinese Patent Application No. 201310672761.7 and is related to U.S. Appl. No. 14/072,383; with English language partial translation.

*Primary Examiner* — Thanh-Nhan P. Nguyen
*Assistant Examiner* — Jia Pan
(74) *Attorney, Agent, or Firm* — Studebaker & Brackett PC

(57) ABSTRACT

A liquid crystal display panel includes signal lines, scanning lines, a common line, and a planarizing film covering the lines. Pattern edge portions of a pixel electrode are arranged to be overlaid above edge portions of the signal lines and the scanning lines. Further, slits being openings formed at the pixel electrode are formed line-symmetrically to each other relative to a reference line which is the extending direction of the common line arranged to cross the center portion of a pixel part.

13 Claims, 11 Drawing Sheets

(56) References Cited

U.S. PATENT DOCUMENTS

| | | |
|---|---|---|
| 2005/0264731 A1* | 12/2005 | Itou et al. ............... 349/114 |
| 2008/0259261 A1* | 10/2008 | Park et al. ............... 349/139 |
| 2009/0128726 A1* | 5/2009 | Tanno ..................... 349/43 |
| 2009/0237342 A1* | 9/2009 | Maede et al. ............ 345/92 |
| 2011/0050551 A1* | 3/2011 | Ota et al. ................ 345/87 |
| 2012/0068202 A1* | 3/2012 | Saito et al. .............. 257/88 |
| 2012/0268358 A1 | 10/2012 | Maede et al. |
| 2013/0088666 A1* | 4/2013 | Ikeda et al. ............. 349/96 |

\* cited by examiner

F I G. 1
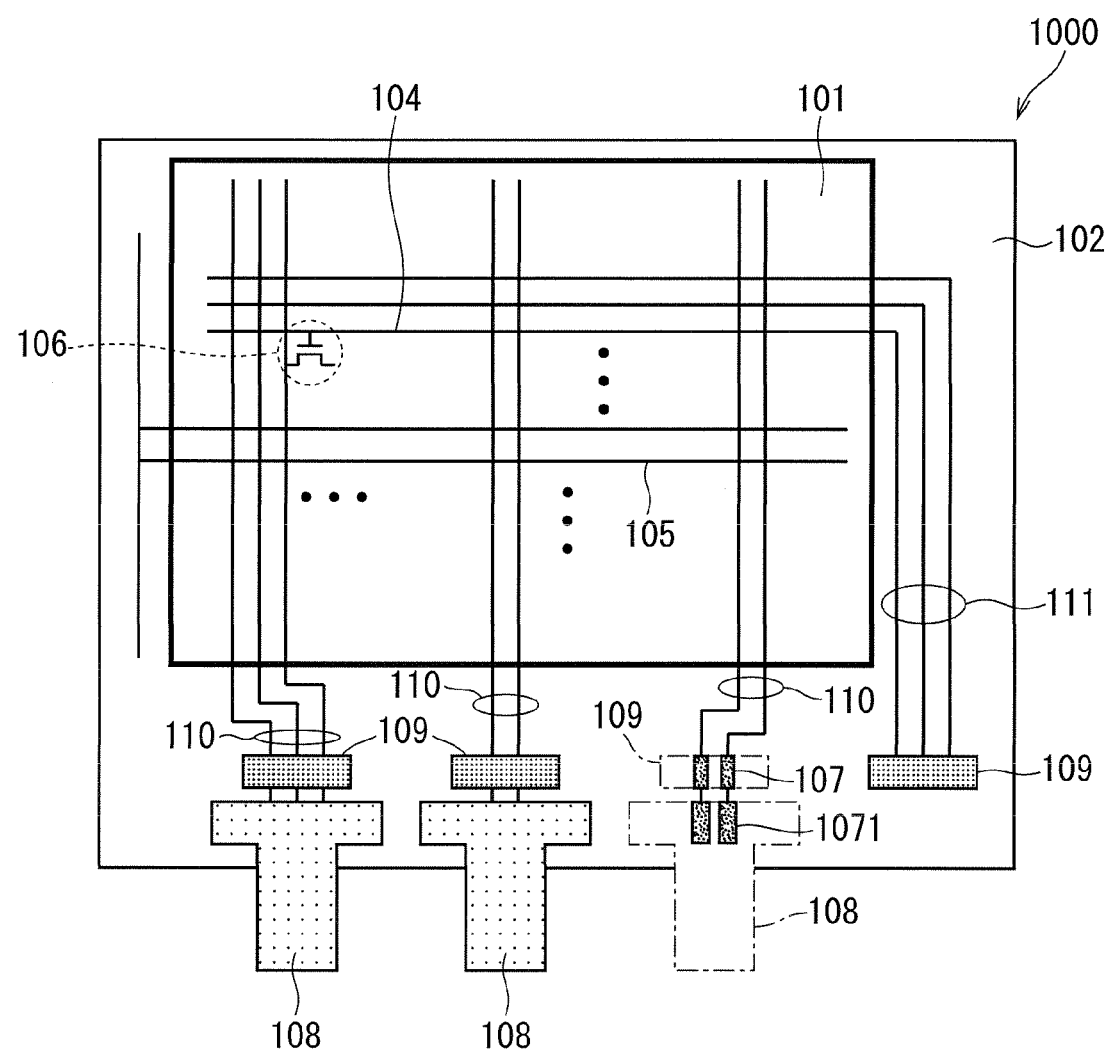

F I G. 2
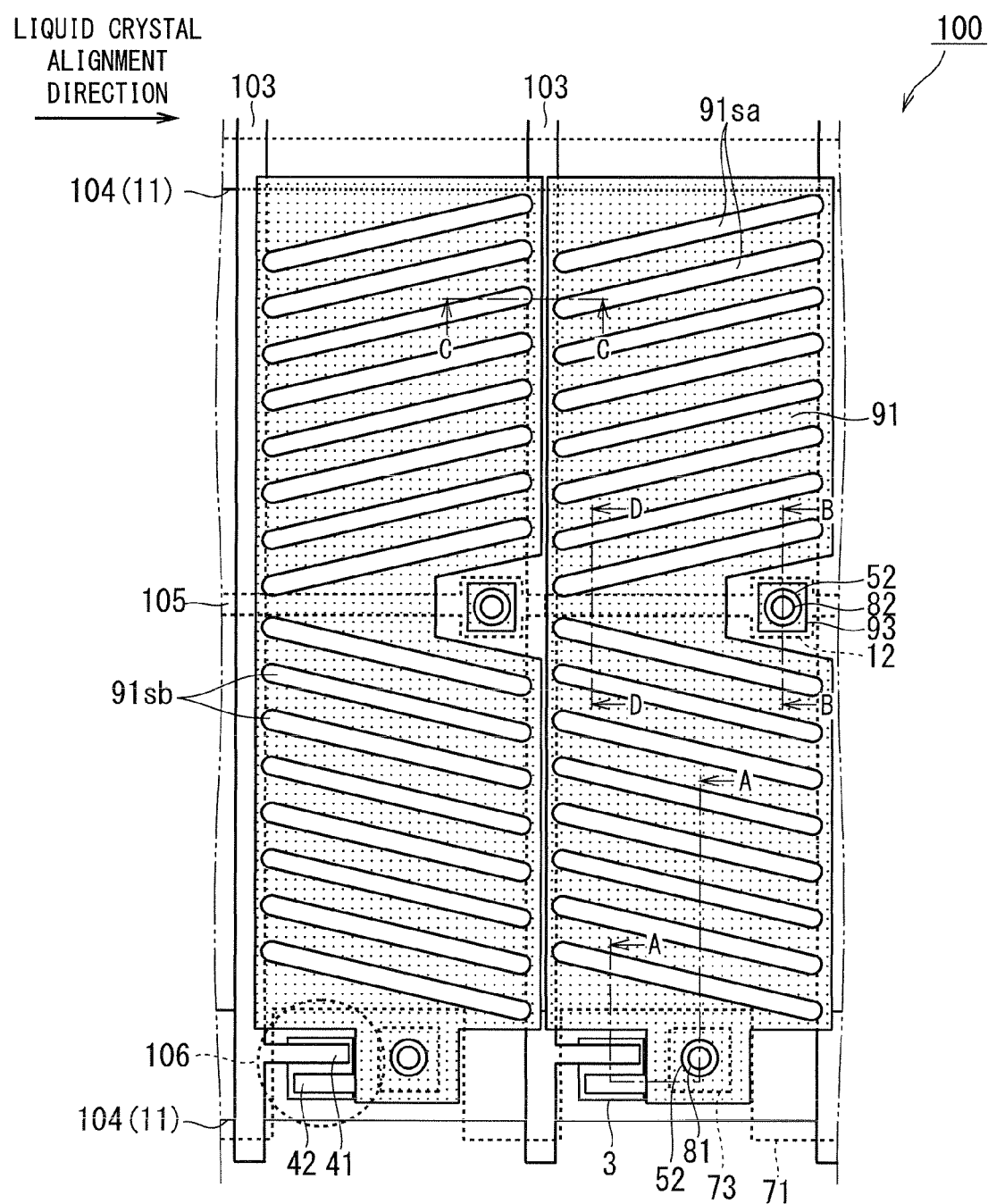

F I G. 3
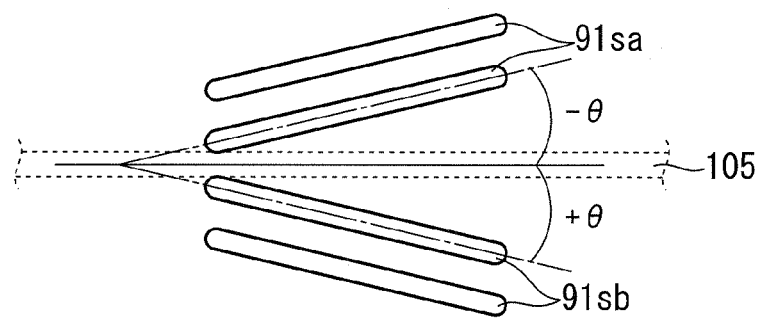

(a)

(b)

F I G. 5
(a)
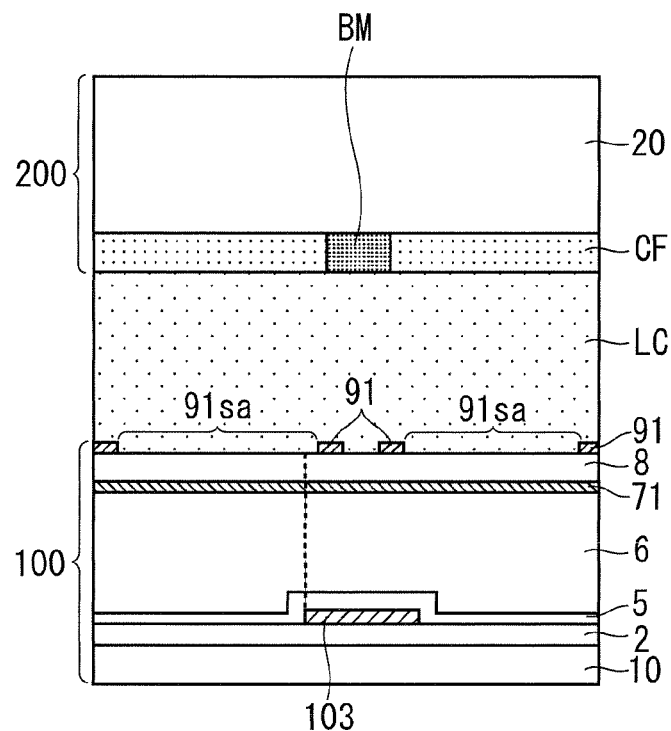
(b)
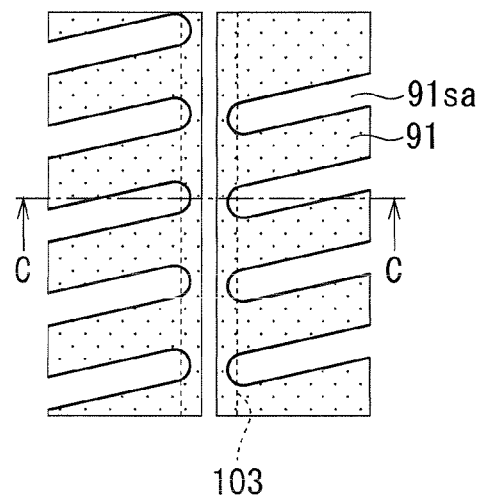

F I G. 7
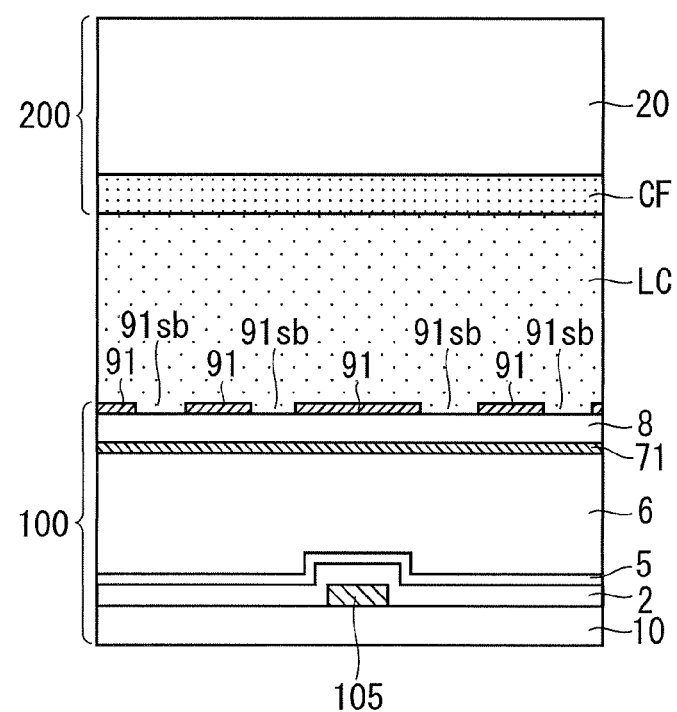

(a)

(b)

LIQUID CRYSTAL DISPLAY PANEL

BACKGROUND OF THE INVENTION

1. Field of the Invention

The present invention relates to a liquid crystal display panel, and particularly to a liquid crystal display panel of a Fringe Field Switching (FFS) mode-liquid crystal display apparatus.

2. Description of the Background Art

As the displaying system of liquid crystal display apparatuses, the TN (Twisted Nematic) mode has been widely employed. However, in recent years, what is coming into use is the horizontal electric field system, in which voltage is applied between the pixel electrode and the opposite electrode to generate an electric field being substantially parallel to the panel, such that the liquid crystal molecules are driven in the horizontal direction. The horizontal electric field system is advantageous in widening the viewing angle. In keeping with the recent trend where high displaying quality is required for every field of view, the horizontal electric field scheme is increasingly used in place of the TN mode.

What are known as the horizontal electric field system are the in-plane switching mode and the FFS mode. Particularly, the FFS mode overcomes the drawback of the in-plane switching mode, i.e., poor light usage efficiency. Further, with the FFS mode, since the pixel electrode and the opposite electrode driving liquid crystal are each formed by a transparent conducting film, the liquid crystal is driven over substantially the entire region on the pixel electrode and the opposite electrode to contribute to displaying images. Accordingly, the FFS mode can achieve higher brightness or reduced power consumption comparing favorably with the TN mode, while achieving wider viewing angles and higher definition. Accordingly, while securing the wide viewing angle characteristic obtained by the horizontal electric field system, higher brightness or reduced power consumption can be achieved.

Further, since the electrode structure is simpler as compared to that of the in-plane switching mode, it is also advantageous in achieving high definition. Accordingly, since higher definition and higher brightness or reduced power consumption are particularly demanded of a small- and medium-sized panels represented by smartphones or tablet terminals belonging to a promising field of products, it can be said that liquid crystal display apparatus of the FFS mode is becoming mainstream of the liquid crystal display apparatus of such a field.

The liquid crystal display apparatus of the FFS mode can be used effectively for displaying images in its entirety, except for the region where the wiring layer functioning as a light shield section is formed and the region where thin-film transistors (TFTs) functioning as switching elements are formed. Thus, it is expected that ideal higher brightness or reduced power consumption can be realized. However, practically, it is difficult to overlay or closely place the pixel electrode or the opposite electrode onto the wiring layer, under the constraints that the light blocking layer must be arranged to the upper portions of the pixel electrode and the opposite electrode, each made of a transparent conducting film, for the regions in the pixel part where unintended behavior of liquid crystal is observed, and that there is increased parasitic capacitance. Therefore, the substantial effective display region becomes narrow (or the proportion of the effective display region relative to the pixel part, i.e., the aperture ratio, is reduced), and ideal high brightness or reduced power consumption is yet to be realized.

In consideration of the problems described above, there are studies on techniques for further improving the aperture ratio of pixels with a liquid crystal display apparatus of the FFS mode. For example, Japanese Patent Application Laid-Open No. 2003-21845 discloses, as a conventional technique, the structure of a conventional liquid crystal display apparatus of the FFS mode in which the color shift phenomenon is prevented by arranging slits in a horizontally symmetric manner at the pixel electrode with reference to a storage capacitance bus line (common line). With this structure, in order to prevent undesirable light leakage invited by an electric field formed in the space between the edge portion of the pixel and opposite electrodes and the gate bus line (gate line) and the data bus line (source line) surrounding the electrodes, a black matrix (light shield film) on the upper substrate must be formed to be in the pixel part more than actually necessary. Thus, a reduction in the aperture ratio is invited.

In order to cope with the problem, the following technique is disclosed: the gate bus line is arranged at the position corresponding to the center portion of the pixel and opposite electrodes, such that the upper and lower edge portions of the pixel and opposite electrodes with reference to the gate bus line are overlaid with the storage capacitance bus line. Thus, light leakage at the edge portions of the pixel and opposite electrodes is prevented. Further, the black matrix extending to the outside of the lines can be dispensed with, in the vertical direction of the pixel and opposite electrodes. Still further, provision of the slits being arranged line-symmetrically with respect to the gate bus line makes it possible to achieve a balance between prevention of the color shift phenomenon and improvement in the pixel aperture ratio.

Further, Japanese Patent Application Laid-Open Nos. 2009-223245 and 2007-293154 disclose the technique in which slits are arranged line-symmetrically to the pixel electrode or the opposite electrode in order to prevent the color shift phenomenon, similarly to the disclosure of Japanese Patent Application Laid-Open No. 2003-21845. In such a structure, the edge portion of the pixel electrode and that of the opposite electrode are overlaid on the gate signal line (scanning line) and the drain signal line (signal line) that surround the electrodes. Thus, light leakage attributed to the electric field leaked from the signal lines is prevented, and the black matrix extending to the outside of the lines at four sides of the pixel and opposite electrodes can be dispensed with. Thus, the color shift phenomenon is prevented, and the pixel aperture ratio is further improved.

However, with the liquid crystal display panel disclosed in Japanese Patent Application Laid-Open No. 2003-21845, the light must still be blocked by the black matrix around the data bus line (source line) in the horizontal direction of the pixel and opposite electrodes (the direction perpendicular to the gate bus line), and hence an improvement in the aperture ratio is insufficient. Further, two common lines must be arranged in the vertical direction of the pixel and opposite electrodes, resulting in an increase in the number of the common line that is originally required one in number per row of pixels, or that can be eliminated by integration of the opposite electrode. Further, when the common line is formed with a light shield film such that it functions to block light, ultimately it results in an increase in the area of the light shield section.

Further, it is known that irregular alignment occurs around the end portions of the slits, reducing the displaying quality. When the displaying quality is given higher priority and therefore the end portions of the slits are also shielded from light by the black matrix, the aperture ratio is further reduced. In consideration of the foregoing, with the liquid crystal display panel disclosed in Japanese Patent Application Laid- Open No. 2003-21845, in terms of the entire display region, it is assumed that the technique does not contribute much toward an improvement in the aperture ratio, and that the displaying quality is poor.

Still further, with the liquid crystal display panel disclosed in Japanese Patent Application Laid-Open No. 2009-223245 also, a reduction in displaying quality due to occurrence of irregular alignment at the region around the end portions of the slits is concerned. When the end portions of the slits are also shielded from light by the black matrix giving priority to the displaying quality, a reduction in the aperture ratio is invited.

Still further, it is known that, at the boundary portion of two types of slits arranged in a line-symmetric manner also, irregular alignment occurs and a reduction in displaying quality is invited. As to each of the liquid crystal display panels respectively disclosed in Japanese Patent Application Laid-Open Nos. 2009-223245 and 2007-293154, a reduction in displaying quality may possibly occur at the boundary portion of the two types of slits, similarly to the phenomenon occurring at the region around the end portions of the slits.

When the boundary portion of the two types of slits is also shielded from light by the black matrix to cope with the problem, a further reduction in aperture ratio may possibly be invited.

Further, as can be seen in each of the liquid crystal display panels respectively disclosed in Japanese Patent Application Laid-Open Nos. 2009-223245 and 2007-293154, though the structure in which the pixel electrode and the opposite electrode are overlaid on the signal lines is effective in preventing electric field leakage and light leakage from the signal lines, noises from the signal lines may influence the pixel electrode. Thus, displaying quality may possibly be reduced. Further, when the parasitic capacitance between these signal lines and the pixel electrode becomes greater to some extent, troubles such as a reduction in speed of signals being written to the pixel electrode may possibly occur.

Further, as can be seen in the structure of the FFS mode liquid crystal display apparatus disclosed as the conventional technique in Japanese Patent Application Laid-Open No. 2003-21845, or the liquid crystal display panel disclosed in Japanese Patent Application Laid-Open No. 2010-217635, when the storage capacitance bus line (common line) is arranged so as to be overlaid with the boundary portion of the two types of slits arranged in a line-symmetric manner, irregular alignment occurring at the boundary portion of the two types of slits can be prevented from visually recognized. However, around the gate line, the light shield film is required, resulting in the reduced aperture ratio.

Further, the common line arranged at the center portion of the pixel electrode creates unevenness on the substrate surface, which in turn causes irregular alignment of liquid crystal to occur on the opposite sides of the common line. Therefore, a wide black matrix extending to the outside of the sides of the common line must be provided to the upper substrate. Accordingly, as a result, with the structure such as disclosed in Japanese Patent Application Laid-Open No. 2003-21845 as the conventional FFS mode liquid crystal display apparatus, or the structure of the liquid crystal display panel disclosed in Japanese Patent Application Laid-Open No. 2010-217635, the aperture ratio of the entire liquid crystal panel is greatly reduced.

As described above, with the FFS mode-liquid crystal display apparatus disclosed in any of Japanese Patent Application Laid-Open Nos. 2003-21845, 2009-223245, 2007-293154, and 2010-217635, it is difficult to achieve both an increase in aperture ratio and high displaying quality.

SUMMARY OF THE INVENTION

An object of the present invention is to provide a liquid crystal display panel of the FFS mode-liquid crystal display apparatus with which both an increase in aperture ratio and high displaying quality can be achieved.

A liquid crystal display panel of the present invention includes: first and second substrates, the first substrate having, a transparent insulating substrate; signal lines and scanning lines arranged on a display region on the transparent insulating substrate, the signal lines and the scanning lines crossing each other to form a matrix; a common line arranged in parallel with the scanning lines; an insulating film covering the signal lines, the scanning lines and the common line; and a lower electrode and an upper electrode arranged in a pixel part surrounded by the scanning lines and the signal lines to oppose to each other in an upper and lower positional relationship on the insulating film, the second substrate being arranged to oppose to the first substrate. The common line is arranged to cross a center portion of the pixel part. The pixel part is divided by the common line into first and second regions. The upper electrode has a slit-shaped first opening in the first region and a slit-shaped second opening in the second region. The first opening is formed as being tilted, such that the slit forms a first angle with a reference line which is an extending direction of the common line. The second opening is formed as being tilted, such that the slit forms a second angle line-symmetrically to the first angle with reference to the reference line. The upper electrode and the lower electrode are arranged to be respectively overlaid on edge portions of the scanning lines and the signal lines, the edge portions existing along extending directions of the scanning lines and the signal lines.

With the liquid crystal display panel described above, it becomes possible to achieve both an increase in aperture ratio and high displaying quality in an FFS mode-liquid crystal display apparatus, because high aperture ratio can be achieved by minimizing the light shield region that blocks out light from the portion where a reduction in displaying quality occurs attributed to irregular alignment of liquid crystal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view showing the planar structure of a liquid crystal display panel of the present invention;

FIG. 2 is a plan view showing the structure of pixel parts formed at a display region of the liquid crystal display panel according to a first preferred embodiment of the present invention;

FIG. 3 is a plan view showing a region around a common line;

FIG. 5 is a diagram showing the arrangement of slits formed at a pixel electrode of the liquid crystal display panel according to the first preferred embodiment of the present invention;

FIG. 7 is a diagram illustrating the arrangement of the black matrix around the common line;

DESCRIPTION OF THE PREFERRED EMBODIMENTS

First Preferred Embodiment

Figure 4:
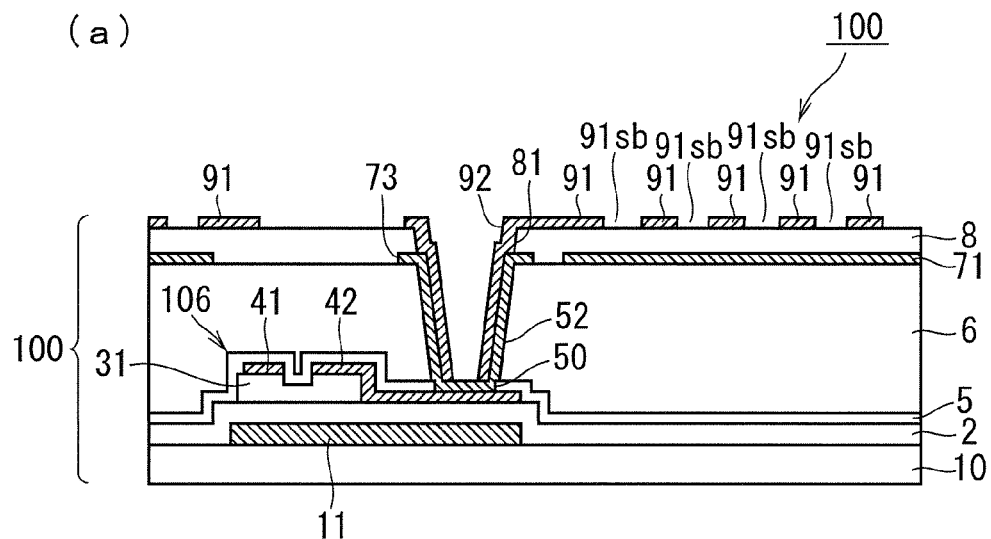
FIG. 4 is a cross-sectional view showing the partial structure of the pixel part.
Figure 4:
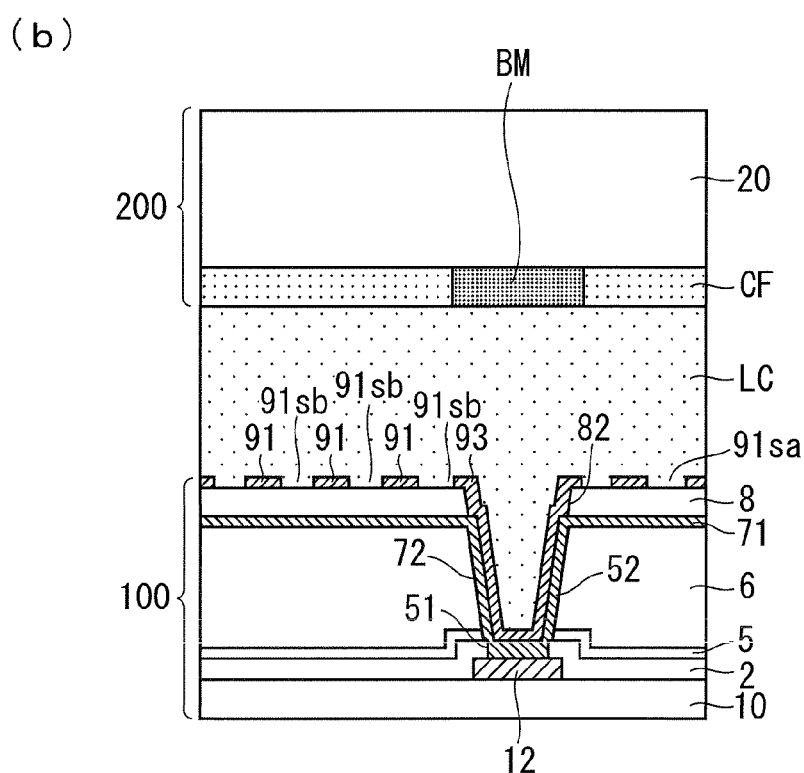

As a preferred embodiment of the present invention, a description will be given of an example in which the present invention is applied to an FFS (Fringe Field Switching)-mode liquid crystal display panel.

<Apparatus Structure>

FIG. 1 is a plan view showing the planar structure of a liquid crystal display panel 1000 of the present invention. Note that, FIG. 1 is of a schematic nature, and does not reflect the exact dimension of the shown constituents. Further, in order to avoid complication, those not being pertinent to the present invention are omitted, or partially simplified.

As shown in FIG. 1, the liquid crystal display panel 1000 can be roughly divided into a display region 101 displaying images and a frame region 102 provided to surround the display region 101.

In the display region 101, a plurality of signal lines 103 and a plurality of scanning lines 104 are arranged so as to be perpendicular to each other. Further, a plurality of common lines 105 are arranged in parallel with the scanning lines 104. A region surrounded by adjacent signal lines 103 and scanning lines 104 forms one pixel part. Thus, the display region 101 has a structure in which a plurality of pixel parts are arranged in a matrix.

Further, at the intersection of the signal line 103 and the scanning line 104, a thin-film transistor 106 is arranged. Thus, one thin-film transistor 106 is provided for each pixel.

The frame region 102 is provided with a plurality of mounting terminals 107 to which lead lines 110 extending from the signal lines 103 of the display region 101 and lead lines 111 extending from the scanning lines 104 are respectively connected, and a plurality of external connector terminals 1071 respectively connected to a plurality of mounting terminals 107. Further, a plurality of common lines 105 are bound at the frame region 102 to be provided with common potential.

An IC (integrated circuit) chip 109 for controlling signals is connected to each of the mounting terminals 107. Further, a wiring board 108 such as an FPC (Flexible Printed Circuit) is connected to each of the external connector terminals 1071.

FIG. 2 is a plan view showing the structure of the pixel parts formed in the display region 101. Note that, FIG. 2 shows the structure on a TFT array substrate 100 side where the thin-film transistors (TFTs) 106 are arranged in a matrix.

As shown in FIG. 2, in each pixel part, a pixel electrode 91 and a opposite electrode 71 are arranged in a upper and lower positional relationship. As voltage is applied between the pixel electrode 91 and the opposite electrode 71, the electric field substantially horizontal to the liquid crystal display panel is produced. Thus, liquid crystal molecules are driven in the horizontal direction, whereby images are displayed.

In order to apply a display voltage based on signal data externally input to the pixel electrode 91, the thin-film transistor 106 for controlling supply of the display voltage is arranged on a transparent insulating substrate (not shown) below the pixel electrode 91 and the opposite electrode 71.

The gate electrode of the thin-film transistor 106 is connected to the scanning line 104 and the source electrode is connected to the signal line 103. Further, in parallel with the scanning line 104, the common line 105 is arranged to cross the substantially central portion of the pixel part.

Further, on the transparent insulating substrate, a protective insulating film (not shown) is provided. Via a contact hole 52 provided at the protective insulating film, the pixel electrode 91 is electrically connected to the drain electrode (not shown). Further, via the contact hole 52 provided at the protective insulating film, the opposite electrode 71 is electrically connected to the common line 105.

With such a structure, when a control signal is supplied from the scanning line 104, current flows from the source electrode side of the thin-film transistor 106 to the drain electrode side. That is, the voltage based on signal data supplied from the signal line 103 is applied to the pixel electrode 91.

The signal data supplied from the signal line 103 is provided from the IC chip 109 connected to the mounting terminal 107 of the frame region 102 (FIG. 1) or from the wiring board 108 connected to the external connector terminal 1071. Then, voltage corresponding to the display data is applied to the pixel electrode 91.

Note that, in the present preferred embodiment, the description is given on an exemplary structure in which, of the upper electrode and the lower electrode of the FFS mode-liquid crystal display panel, the upper electrode is the pixel electrode 91 and the lower electrode is the opposite electrode 71; and slit-shaped openings are provided to the pixel electrode 91 such that the electric field produced by the voltage based on signal data is directed upward. However, it is also possible to employ the structure in which the lower electrode is the pixel electrode 91; the upper electrode is the opposite electrode 71; and the slit-shaped openings are provided to the opposite electrode 71.

When the positional relationship between the slit-shaped openings and the contour portion of the planar pattern of the pixel electrode 91 satisfies the following relationship, the similar function and operation can be achieved.

That is, as shown in FIG. 2, the pixel part is divided into two, upper and lower regions, about the common line 105 crossing the substantially central portion of the pixel part. A plurality of slits 91sa are provided at the upper half region relative to the common line 105 of the pixel electrode 91, and a plurality of slits 91sb are provided at the lower half region.

The slits 91sa and the slits 91sb extend such that their respective longitudinal directions are oriented in different directions. FIG. 3 shows the region near the common line 105. When the extending direction of the common line 105 is the reference (0 degrees), regarding the clockwise direction as positive, the slits 91sa are arranged as being tilted by angle $-\theta$ and the slits 91sb are arranged as being tilted by angle $+\theta$.

Accordingly, the slits 91sa and 91sb are arranged substantially line-symmetrically on the upper and lower sides relative to the common line 105. Employing such a structure, changes in color depending on the visual angle (the observation direction relative to the panel plane) when the liquid crystal display panel displays images, that is, occurrence of the color shift phenomenon can be alleviated. Further, in order to achieve the operation described above, not necessarily all the slits 91sa and 91sb are arranged line-symmetrically. By providing the slits 91sa tilted by angle −θ relative to the reference line and the slits 91sb tilted by angle +θ, more preferably, by substantially equalizing the number or length of the two types of slits differing in the tilting direction between each other such that a sum of the lengths of the slits 91sa and that of the slits 91sb are substantially equalized, changes in color around the slits 91sa and changes in color around the slits 91sb can be cancelled out in the region of one pixel part, and the operation described above can be achieved.

Note that, angle θ is set to a relatively small angle of less than 45 degrees. This structure can be regarded as the slits 91sa and 91sb being tilted upward and downward by a prescribed angle with reference to the extending direction of the common line 105 (or the scanning line 104).

Next, a description will be given of the cross-sectional structure of the pixel part with reference to FIGS. 4 to 6. Part (a) of FIG. 4 is a cross-sectional view taken along line A-A viewed in the arrow direction in FIG. 2. Part (b) of FIG. 4 is a cross-sectional view taken along line B-B viewed in the arrow direction in FIG. 2. Note that, though part (a) of FIG. 4 shows solely the structure of the TFT array substrate 100, part (b) of FIG. 4 shows, in addition to the TFT array substrate 100, also a color filter substrate 200 arranged to oppose to the TFT array substrate 100.

As shown in parts (a) and (b) of FIG. 4 on the transparent insulating substrate 10 of the display region 101, a gate electrode 11 is formed in the region where the thin-film transistor 106 is formed. Further, the scanning line 104 (FIG. 2) extending from the gate electrode 11, the common line 105 (FIG. 1) arranged parallel to the scanning line 104, and a common line pad 12 extending from the common line 105 are formed.

Then, a gate insulating film 2 is formed to cover the gate electrode 11, the scanning line 104, the common line 105, and the common line pad 12. As the gate insulating film 2, for example a SiN film is used. On a region above the gate electrode 11, an island-shaped semiconductor film 31 is formed so as to be in contact with the gate insulating film 2.

The semiconductor film 31 is structured by any of amorphous silicon, microcrystalline silicon and polycrystalline silicon, a silicon semiconductor film being a laminate made up of a combination of the foregoing materials, or an oxide semiconductor film.

The semiconductor film 31 is separated into the source region and the drain region with the channel region interposed therebetween. On the source region and the drain region, a source electrode 41 and a drain electrode 42 are formed, respectively.

In this manner, the thin-film transistor 106 is structured by the gate electrode 11, the semiconductor film 31, the source electrode 41, and the drain electrode 42.

Further, on the gate insulating film 2, the signal line 103 (FIG. 2) made of a metal film being the material identical to that of the source electrode 41 and the drain electrode 42 is formed. Further, a protective insulating film 5 is formed so as to cover the entire thin-film transistor 106 and the signal line 103.

The protective insulating film 5 is an inorganic insulating film, and may be a single-layer SiN film or a multilayer film (e.g., a multilayer film made up of a SiO film and a SiN film).

Then, a planarizing film 6 is formed on the protective insulating film 5. The SiN film forming the protective insulating film 5 prevents the characteristic of the thin-film transistor 106 from being damaged by moisture or the like of the planarizing film 6 or the like. The planarizing film 6 is formed to cover the signal line 103, the scanning line 104 and the common line 105. Thus, the uneven shape formed by the thickness of the wiring layers themselves is planarized, and a flat surface is formed on the surface of the TFT array substrate 100 over the signal line 103, the scanning line 104 and the common line 105.

Further, the planarizing film 6 herein is an organic resin film whose main component is acrylic resin or an SOG (spin on glass) film. This is because, in the present preferred embodiment, the lower one of the opposite electrode 71 and the pixel electrode 91 overlaps with the scanning line 104 and the signal line 103 in a plan view, having the planarizing film 6 interposed therebetween.

With such a structure, noises from the signal line 103 may affect the pixel electrode 91, possibly damaging display quality. Further, when the parasitic capacitance between the scanning line 104 or the signal line 103 and the pixel electrode 91 becomes greater to some extent, troubles such as a reduction in speed of signals being written to the pixel electrode 91 may occur.

Accordingly, by determining the thickness of the planarizing film 6, which determines the parasitic capacitance between the scanning line 104 or the signal line 103 and the opposite electrode 71 and between the scanning line 104 or the signal line 103 and the pixel electrode 91, to be at least 1 μm, the parasitic capacitance can be reduced. To this end, the material that can be applied in formation is desirable. Further, lower permittivity ε is desirable.

The permittivity ε of acrylic resin or the SOG film is about 3 to 4, which is lower than that of a SiN film being 6 to 7. Therefore, acrylic resin or the SOG film is advantageous in reducing the parasitic capacitance. Further, acrylic resin has the following characteristics: highly transparent; cost-effective; easier to handle as it can be used as an application film by being dissolved in an organic solvent; and capability of being calcined at relatively low temperatures.

Further, though a $SiO_2$ film formed by CVD or sputtering has the permittivity ε which is similar to that of a SOG film, it is difficult to obtain a thickness of 1 μm or more. Further, it has a characteristic that it is difficult to achieve planarization similarly to a SiN film.

On the planarizing film 6 having become the flat surface, the opposite electrode 71 structured by a first transparent conducting film made of ITO (Indium Tin Oxide) or IZO (Indium Zinc Oxide) is formed. For covering the opposite electrode 71, an interlayer insulating film 8 is formed on the planarizing film 6. Then, on the interlayer insulating film 8, the pixel electrode 91 structured with a second transparent conducting film made of ITO or IZO is formed.

Then, as shown in part (a) of FIG. 4, a contact hole 50 is formed so as to penetrate through the protective insulating film 5 on the drain electrode 42 to reach the drain electrode 42. Further, as shown in part (b) of FIG. 4, a contact hole 51 is formed to penetrate through the gate insulating film 2 and the protective insulating film 5 on the common line pad 12.

Through the contact holes 50 and 51, the opposite electrode 71 and the pixel electrode 91 structured by the transparent conducting film of ITO or IZO are respectively connected to the drain electrode 42 and the common line pad 12.

Further, between the opposite electrode 71 and the pixel electrode 91, the interlayer insulating film 8 is formed. The interlayer insulating film 8 maintains the electrodes to be insulated from each other, and a storage capacitance that contributes toward storing charges at the pixel electrode 91 is formed.

As shown in parts (a) and (b) of FIG. 4, the contact hole 52 is formed at the planarizing film 6 on the protective insulating film 5 such that the metal films such as the drain electrode 42 and the common line pad 12 are not directly brought into contact with the planarizing film 6. The contact hole 52 communicates with the contact holes 50 and 51.

That is, as shown in part (b) of FIG. 4, the opposite electrode 71 is electrically connected to the common line pad 12 via the transparent conducting film 72 extending from the opposite electrode 71 and the contact holes 52 and 51. That is, the transparent conducting film 72 extending from the opposite electrode 71 covers the inner wall side face of the contact holes 52 and 51 and also the surface of the common line pad 12 uncovered at the bottom face portion of the contact hole 51, whereby the common line pad 12 and the opposite electrode 71 are electrically connected to each other.

Further, the opposite electrode 71 is electrically connected also to a transparent conducting film 93, which is made of the material identical to that of the pixel electrode 91 at the same layer, via a contact hole 82 of the interlayer insulating film 8 formed above the contact hole 52. That is, it is structured such that the transparent conducting film 93 covers further over the transparent conducting film 72 covering the inner face of the contact holes 51 and 52. The inner wall side face of the contact holes 51 and 52 and the bottom portion of the contact hole 51 are covered by a lamination film made up of the transparent conducting film 72 and the transparent conducting film 93.

Note that, since the transparent conducting film 93 is electrically isolated from the pixel electrode 91, the transparent conducting film 93 and the pixel electrode 91 will not be electrically connected to each other.

Further, as shown in part (a) of FIG. 4, a transparent conducting film 73 is formed by the material identical to that of the opposite electrode 71 at the same layer, so as to cover the inner wall side face of the contact holes 50 and 52 and to cover the surface of the drain electrode 42 uncovered at the bottom face portion of the contact hole 50.

Note that, since the transparent conducting film 73 is electrically isolated from the opposite electrode 71, the transparent conducting film 73 and the opposite electrode 71 will not be electrically connected to each other.

Then, by the pixel electrode 91 being electrically connected to the transparent conducting film 73 covering the inner face of the contact holes 50 and 52 via the contact hole 81 of the interlayer insulating film 8 formed above the contact hole 52, the pixel electrode 91 is electrically connected to the drain electrode 42. That is, the transparent conducting film 92 extending from the pixel electrode 91 covers the inner wall side face of the contact hole 81, and further covers the transparent conducting film 73 covering the inner face of the contact holes 50 and 52. The inner wall side face of the contact holes 50 and 52 and the bottom portion of the contact hole 50 are covered by a lamination film made up of the transparent conducting film 73 and the transparent conducting film 92.

Employing such a structure, it becomes possible to prevent the metal films structuring the drain electrode 42 and the common line pad 12 from being corroded by moisture of the planarizing film 6.

Next, a description will be given of the arrangement of a light shield film that directly influences the pixel aperture ratio. As shown in part (b) of FIG. 4, the color filter substrate 200 is arranged to oppose to the TFT array substrate 100 via the liquid crystal layer LC. At the color filter substrate 200, a black matrix BM being a light shield film is interposed in the color filter CF. This arrangement state of the black matrix BM influences the pixel aperture ratio. Note that, while not shown, on the topmost surface of the TFT array substrate 100 and that of the color filter substrate 200 each in the display region 101 and being in contact with the liquid crystal layer LC, an alignment film that controls the alignment of liquid crystal is formed. On the surface of the alignment film, the alignment treatment in the prescribed direction is performed by the rubbing treatment or the optical alignment treatment. As the specific alignment treatment direction, it should be performed in the direction in which the initial alignment of liquid crystal is to be desirably set, i.e., in the direction represented by an arrow in FIG. 2.

Firstly, a description will be given of the arrangement of the black matrix BM around the signal line 103 (FIG. 2). Around the signal line 103, the arrangement of the pixel electrode 91 relating to the operation of liquid crystal directly influencing displaying and the arrangement of the slits formed at the pixel electrode 91 are concerned. A description will be given of the arrangement of these elements with reference to FIGS. 5 and 6.

Part (a) of FIG. 5 is a cross-sectional view taken along line C-C viewed in the arrow direction in FIG. 2, showing the arrangement of the TFT array substrate 100, the liquid crystal layer LC and the color filter substrate 200. Further, FIG. 6 is a diagram showing the light shield region, which is realized by the black matrix BM provided to the color filter substrate 200 provided to oppose to the TFT array substrate 100 shown in FIG. 2, being overlaid with the TFT array substrate 100.

As shown in part (a) of FIG. 5, in the liquid crystal display panel according to the first preferred embodiment, the color filter substrate 200 is arranged to oppose to the TFT array substrate 100 having the liquid crystal layer LC interposed therebetween. As represented by broken lines in FIG. 2, in connection with the position where the opposite electrode 71 is formed, the opening portion is only the upper portion of the region where the thin-film transistor 106 is arranged at each pixel in the display region.

In other words, the opposite electrode 71 is formed to cover the entire display region except for the region where the thin-film transistor 106 is formed. Accordingly, in connection with the signal line 103, the opposite electrode 71 is formed across adjacent pixels including the upper portion of the signal line 103.

Further, as shown in part (a) of FIG. 5, the pixel electrode 91 is arranged, in connection with the signal line 103, to be overlaid above the signal line 103. That is, the pattern edge portion of the pixel electrode 91 is arranged above one edge portion of the signal line 103 arranged between the pixel electrodes 91. Note that, while not shown, the upper portion of the other edge portion of the signal line 103 is covered by the pattern edge portion of the adjacent pixel electrode 91.

Further, as to the slits 91sa and 91sb each being the opening formed at the pixel electrode 91, one tip portion of each slit is formed to be overlaid above the adjacent signal line 103. Further, while not shown, the other tip portion of the slit is formed to be overlaid above the other adjacent signal line 103. That is, the slits 91sa and 91sb are each formed to extend over the two signal lines 103 which are respectively arranged on the long sides of the pixel electrode 91 so as to sandwich the pixel electrode 91.

Note that, part (b) of FIG. 5 is an enlarged plan view of the region corresponding to line C-C in FIG. 2. Part (a) of FIG. 5 is a cross-sectional view of a region where the slits 91sa are formed, out of the slits 91sa and 91sb being two types of slit-shaped openings. The structure holds true for the region where the slits 91sb are formed, except that the structure becomes upside down in the drawing. Similarly to the slits 91sa, the slits 91sb are formed such that their respective tip portions are overlaid above the signal lines 103.

Figure 6:
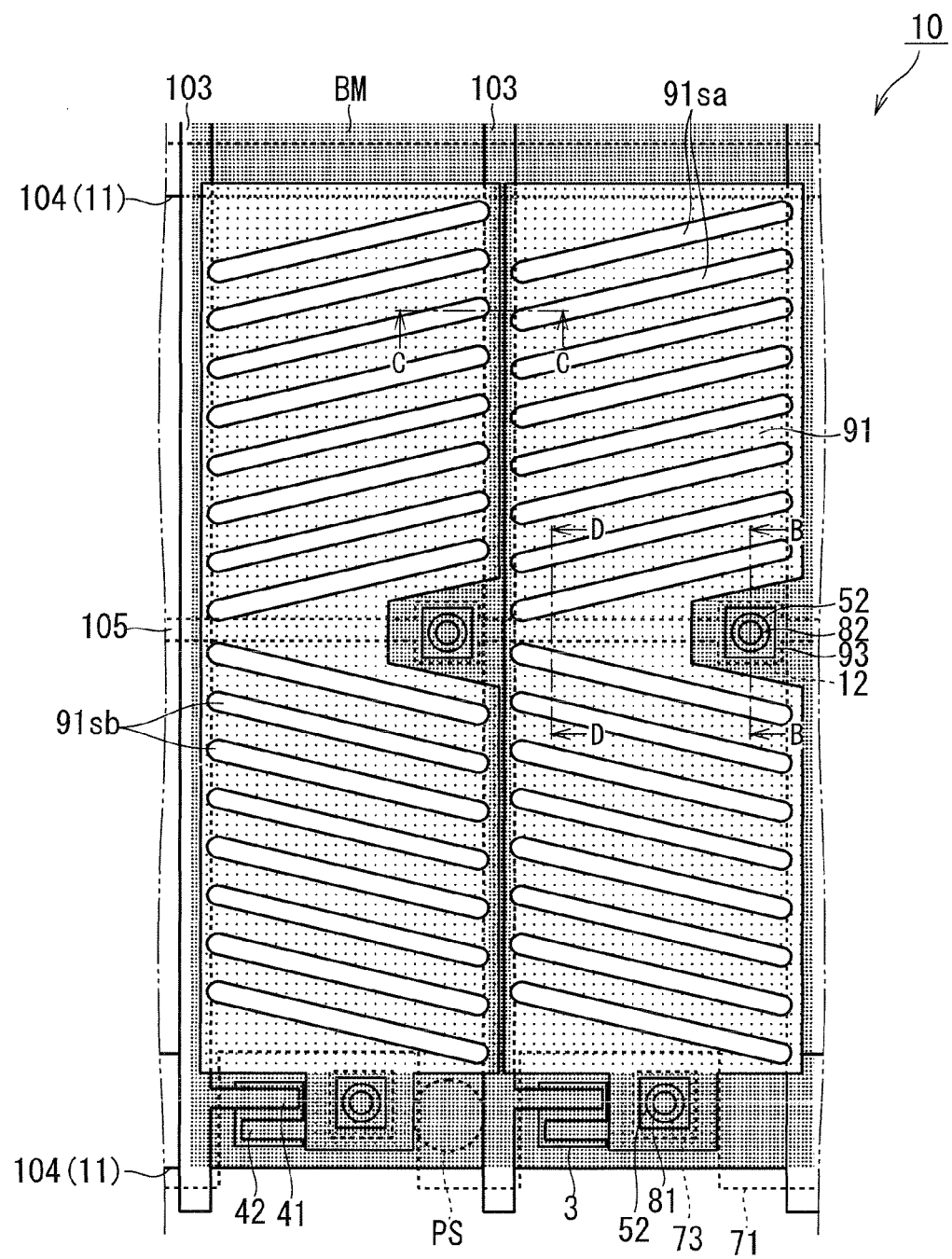
FIG. 6 is a diagram illustrating the arrangement of a black matrix of the liquid crystal display panel according to the first preferred embodiment of the present invention.

Further, as shown in part (a) of FIGS. 5 and 6, the black matrix BM provided to the color filter substrate 200 is arranged at the portion overlaid with the region where the signal line 103 is arranged, without protruding outward in the plane direction from the region where the signal line 103 is arranged. Note that, around the signal line 103, by the signal line 103 functioning also as a light shield film, the regions around the tip portions of the slits 91sa and 91sb each being an opening are shielded from light.

That is, the portion where a reduction in display quality attributed to irregular alignment that is prone to occur around the tip portions of the slits 91sa and 91sb is shielded from light by the signal line 103. Further, the upper portion of the opposite edge portions of the signal line 103 is covered by the pixel electrode 91. Therefore, light leakage attributed to the leakage of electric field from the signal line 103 will not occur.

Accordingly, the region that requires light shielding is not formed in the opposite edge portions of the signal line 103. Therefore, as shown in part (a) of FIG. 5, it is not necessary to provide the black matrix BM to protrude outward in the plane direction from the region where the signal line 103 is arranged.

Note that, since the signal line 103 functions also as a light shield film, it is also possible to dispense with the black matrix BM at the portion overlapping with the signal line 103.

Next, a description will be given of the arrangement of the black matrix BM around the common line 105 (FIG. 2) with reference to part (b) of FIG. 4, FIG. 6 and FIG. 7.

Firstly, as shown in part (b) of FIG. 4, a description will be given of the region including the contact holes 52 and 82, which are formed above the common line pad 12 extending from the common line 105. As shown in part (b) of FIG. 4, the sidewall of the contact hole 52 formed at the planarizing film 6 is normally formed as a relatively gradual tilt face. The top opening of the contact hole 52 has a relatively great area. Further, since the thickness of the planarizing film 6 is relatively great, the depth of the contact hole 52 is also relatively great. Accordingly, by providing the contact hole 52, relatively great unevenness is formed on the surface of the planarizing film 6. Such unevenness of the surface invites irregular alignment of liquid crystal. Furthermore, at the portion where the contact hole 82 is formed, irregular alignment of liquid crystal occurs at a relatively wide region in a plane direction, and disadvantageously affects the displaying manner.

Accordingly, with the liquid crystal display panel according to the first preferred embodiment, as shown in part (b) of FIG. 4, the black matrix BM is provided so as to extend outward at least from the top edge portion of the contact hole 52, such that the black matrix BM can block light by covering the entire region above the contact hole 52.

Note that, it is desirable that the black matrix BM is formed to cover the region outside the top edge portion of the contact hole 52 by a prescribed distance, in order to address the misalignment between the TFT array substrate 100 and the color filter substrate 200 or the case where the irregular alignment region reaches the region surrounding the unevenness of the surface formed by the contact hole 52. For example, as shown in FIG. 6, the pixel electrode 91 is not formed at the region where the contact holes 82 and 52 are formed and the region nearby. It is desirable that such regions are covered by the black matrix BM.

Note that, it is also possible to form the common line pad 12 that extends from the common line 105, which functions also as a light shield film, to cover the region outside the top edge portion of the contact hole 52, so as to block out light from the region where irregular alignment of liquid crystal is caused by the surface uneven portion attributed to the contact hole 52.

In this case, it is also possible to dispense with the black matrix BM above the contact hole 52. Further, since it is not necessary for the misalignment between the TFT array substrate 100 and the color filter substrate 200 to be taken into consideration, the light shield region may be smaller than that in the case where light is shielded by the black matrix BM.

Although not mentioned in the foregoing since the influence of irregular alignment of liquid crystal caused by the surface unevenness of the contact hole 52 is greater, note that the region where the contact hole 52 and the common line pad 12 extending from the common line 105 are formed corresponds to the boundary portion of the two types of slits 91sa and 91sb differing in the tilting direction, and also corresponds to the portion where the irregular alignment occurs. However, the common line pad 12 extending from the common line 105 functioning also as a light shield film is formed at the boundary portion, and the boundary portion is further shielded from light by the black matrix BM. Accordingly, the irregular alignment region occurring at the boundary portion of the slits 91sa and 91sb is likewise shielded from light without any trouble.

Next, with reference to FIG. 7 being a cross-sectional view taken along line D-D viewed in the arrow direction in FIG. 2, a description will be given of the region where the common line 105 is arranged, other than the region where the contact holes 52 and 82 are formed. As has been described in the foregoing, the region corresponds to the boundary portion of the two types of slits 91sa and 91sb differing in the tilting direction. The region also corresponds to the portion where irregular alignment occurs.

However, since the common line 105 functioning also as a light shield film is formed at the boundary portion, light can be blocked out from the portion in the boundary portion where irregular alignment occurs. Further, in the case where unevenness occurs at the TFT array substrate 100 attributed to the thickness of the common line 105 itself, an irregular alignment region is formed at each of the opposite sides of the common line 105. Therefore, such regions must be shielded from light by the black matrix BM formed on the color filter substrate 200.

However, as shown in FIG. 7, the uneven shape formed by the thickness of the common line 105 itself does not appear on the topmost surface of the TFT array substrate 100, thanks to the planarizing film 6 forming the flat surface on the surface of the TFT array substrate 100 above the common line 105. Therefore, no irregular alignment region occurs at the opposite sides of the common line 105.

Accordingly, the region where the common line 105 is formed except for the region where the contact hole 52 and 82 are formed is satisfactory shielded from light by the common line 105 functioning also as a light shield film. It is not necessary to form the black matrix BM at the corresponding region on the color filter substrate 200, and the corresponding region can dispense with the black matrix BM as shown in FIGS. 6 and 7.

Note that, it is not necessary to completely dispense with the black matrix BM as shown in FIGS. 6 and 7. Instead, similarly to the formation regions for the signal line 103 and the scanning line 104, the black matrix BM may be arranged only at the region overlaid with the common line 105, so as not to protrude outward in the plane direction from the formation region for the common line 105. With this structure, the aperture ratio will not greatly change. However, when the common line 105 is narrowly formed, for example, to be approximately as narrow as the overlay accuracy between the TFT array substrate 100 and the color filter substrate 200, it is desirable not to form the black matrix BM because a substantial reduction in the aperture ratio may be invited as being influenced by the overlay accuracy.

As has been described in the foregoing, with the liquid crystal display panel according to the first preferred embodiment, as shown in the FIG. 6, the black matrix BM is not formed outside the formation region for the signal line 103 and outside the formation region for the scanning line 104 in the display region. Further, the black matrix BM is not formed on the common line 105 also, except for the formation region for the contact holes 52 and 82 and the region nearby. Accordingly, the pixel part with ideal high aperture ratio can be obtained, in which the minimum required line regions and the contact hole formation regions are used as the light shield region.

Note that, as shown in FIG. 6, a pillar spacer PS is arranged at the pixel part in order to keep the distance between the TFT array substrate 100 and the color filter substrate 200 at a prescribed distance. In FIG. 6, the pillar spacer PS is provided on the scanning line 104.

Since irregular alignment of liquid crystal may possibly occur also at the region around the pillar spacer PS because of unevenness of the pillar spacer PS, light must be blocked. Further, since irregular alignment of liquid crystal may possibly occur at the region around the contact hole 52 provided at the planarizing film 6 on the scanning line 104, which functions also as a light shield film, light must be shielded likewise.

To this end, the pillar spacer PS is positioned around the contact hole 52 of the planarizing film 6; alternatively, the pillar spacer PS is arranged as being overlaid (aligned) on the contact holes 52 and 81, to form the light shield region. Thus, a further desirable structure in which light shield region for the entire pixel is reduced can be obtained. From the similar viewpoint, by forming the pillar spacer PS at the position as being overlaid on the contact holes 52 and 82 on the common line 105, the similar effect can be obtained.

Finally, with reference to FIG. 8, a description will be given of the relationship between the optical sheet and the alignment axis in the liquid crystal display panel according to the first preferred embodiment. As represented by an arrow in FIG. 2, the alignment direction of liquid crystal is set to be in parallel with the extending direction of the common line 105 or the extending direction of the scanning line 104.

For example, in the case where the initial alignment of the liquid crystal is set by subjecting the surfaces of the TFT array substrate 100 and the color filter substrate 200 to an alignment treatment such as the rubbing treatment, the rubbing treatment is performed in the direction represented by the arrow in FIG. 2. As a result, the alignment direction of liquid crystal becomes 0°.

Figure 8:
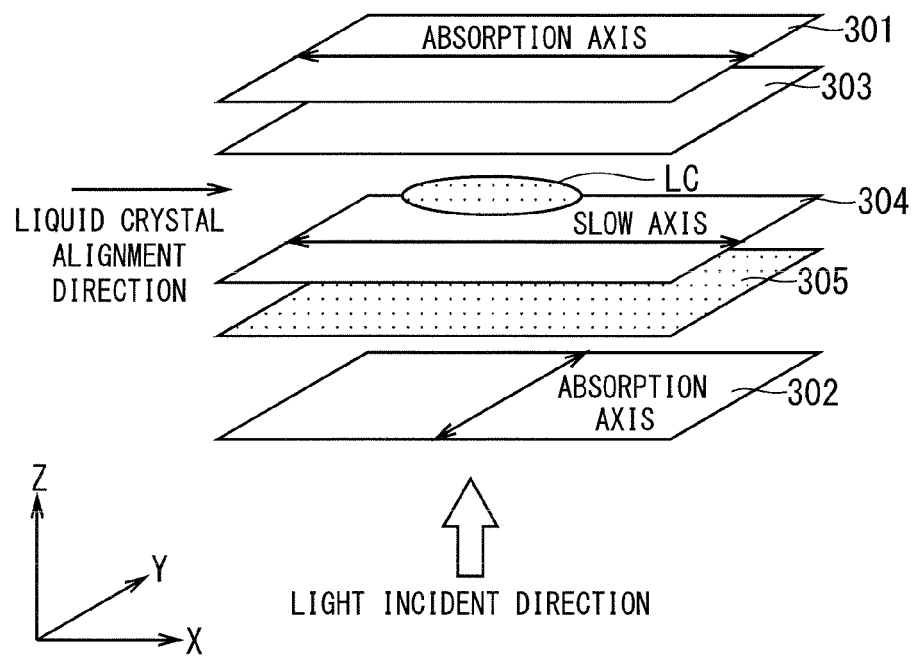
FIG. 8 is a diagram illustrating the relationship between an optical sheet and an alignment axis of the liquid crystal display panel of the present invention.

In this case, as shown in FIG. 8, a biaxial retardation film 304 is arranged on the light incident side that is below the liquid crystal layer LC and that is represented by an arrow. The biaxial retardation film 304 is a film whose index of refraction differs in each of X-, Y-, and Z directions, and which is used for improving the viewing angle characteristic in the FFS mode. Note that, while the slow axis in which light propagates slowly is shown as the axis in parallel with X direction in FIG. 8, the slow axis may be the axis being in parallel with Y direction.

Further, below the biaxial retardation film 304, a polarizer protective film (optically isotropic film) 305 is arranged, to protect a polarizer 302 arranged beneath.

Still further, above the biaxial retardation film 304, a polarizer protective film (optically isotropic film) 303 is arranged, to protect a polarizer 301 arranged above.

Note that, the polarizer 301 has the absorption axis being in parallel with X direction, whereas the polarizer 302 has the absorption axis being in parallel with Y direction. Thus, the absorption axis of the polarizer 301 and that of the polarizer 302 are perpendicular to each other.

In this manner, by arranging the biaxial retardation film 304 on the light incident side below the liquid crystal layer LC, a desired optical compensation effect can be obtained without being influenced by the irregular state of the liquid crystal layer LC. Accordingly, influence on the display characteristic can be alleviated in the regions where irregular alignment occurs, such as the boundary region of the slits 91sa and the slits 91sb described above, around the opposite tip portions of the slits 91sa and 91sb, and around the uneven surface portion of the contact hole. Thus, the area of the light shield regions (the black matrix, the wiring layer (the common line, the gate line, and the source line)) required in such regions can be minimized.

Conversely, when the biaxial retardation film is arranged on the display plane side instead of the light incident side, the light from the light source will pass firstly the liquid crystal layer. Then, depolarization occurs because of scattering of liquid crystal at the irregular alignment region. Accordingly, since linear polarization is already disturbed when the light passes through the biaxial retardation film, a desired optical compensation effect cannot be obtained. That is, even in the region with minor irregular alignment, the displaying characteristic may be influenced in terms of the optical compensation effect.

With a conventional liquid crystal display panel, it is not selected to arrange the biaxial retardation film 304 on the light incident side below the liquid crystal layer LC in consideration of the optical design. That is, when a high aperture ratio is desired with the conventional structure, it is necessary to set the liquid crystal alignment direction to 90° (vertical direction). In this case, when the biaxial retardation film is arranged on the light incident side, the optical design requires setting the absorption axis of the upper polarizer to 90°. In this case, there is a problem that, when the user puts on polarized sunglasses, no displayed image can be seen (i.e., appearing in black entirely). On the other hand, the effect of improving the viewing angle of the biaxial retardation film itself can be obtained even when the biaxial retardation film is arranged on the display plane side of the liquid crystal display panel and, therefore, the biaxial retardation film is arranged on the display plane side of the liquid crystal panel with the conventional structure.

However, with the liquid crystal display panel according to the present invention, a high aperture ratio can be achieved even when the alignment direction of liquid crystal is set to 0° (horizontal direction). Accordingly, in terms of optical design, it becomes possible to arrange the biaxial retardation film 304 on the light incident side below the liquid crystal layer LC, and to set the angle of the absorption axis of the polarizer 301 on the display plane side to 0° (horizontal direction).

As a result, a liquid crystal display panel and a liquid crystal display apparatus including the same can be obtained, with which panel visibility is secured for polarized sunglasses, and requirements for a high aperture ratio and wide viewing angle characteristics are satisfied.

As has been described above, with the liquid crystal display panel according to the first preferred embodiment, in connection with the liquid crystal display apparatus of the FFS mode, a high aperture ratio can be achieved by minimizing the light shield regions. Further, light is properly shielded in the regions where irregular alignment occurs, such as around the signal line and the boundary portion of the two types of slit-shaped openings differing in the tilting direction. Accordingly, irregular alignment will not be visually recognized, while high displaying quality is achieved.

Note that, achieving a high aperture ratio also contributes to a reduction in power consumed by the liquid crystal display apparatus. Further, as has been described earlier, it goes without saying that, similar operation and effect can be obtained with the structure in which the opposite electrode 71 is arranged at a layer higher than the pixel electrode 91, and the slit-shaped openings are provided at the opposite electrode 71.

Second Preferred Embodiment

Next, with reference to FIGS. 9 to 11, a description will be given of the structure of a liquid crystal display panel according to a second preferred embodiment of the present invention. Note that, in the following, identical reference characters are allotted to structures similar to those in the first preferred embodiment, whose description has been given with reference to FIGS. 1 to 8, and the description thereof will not be repeated.

Figure 9:
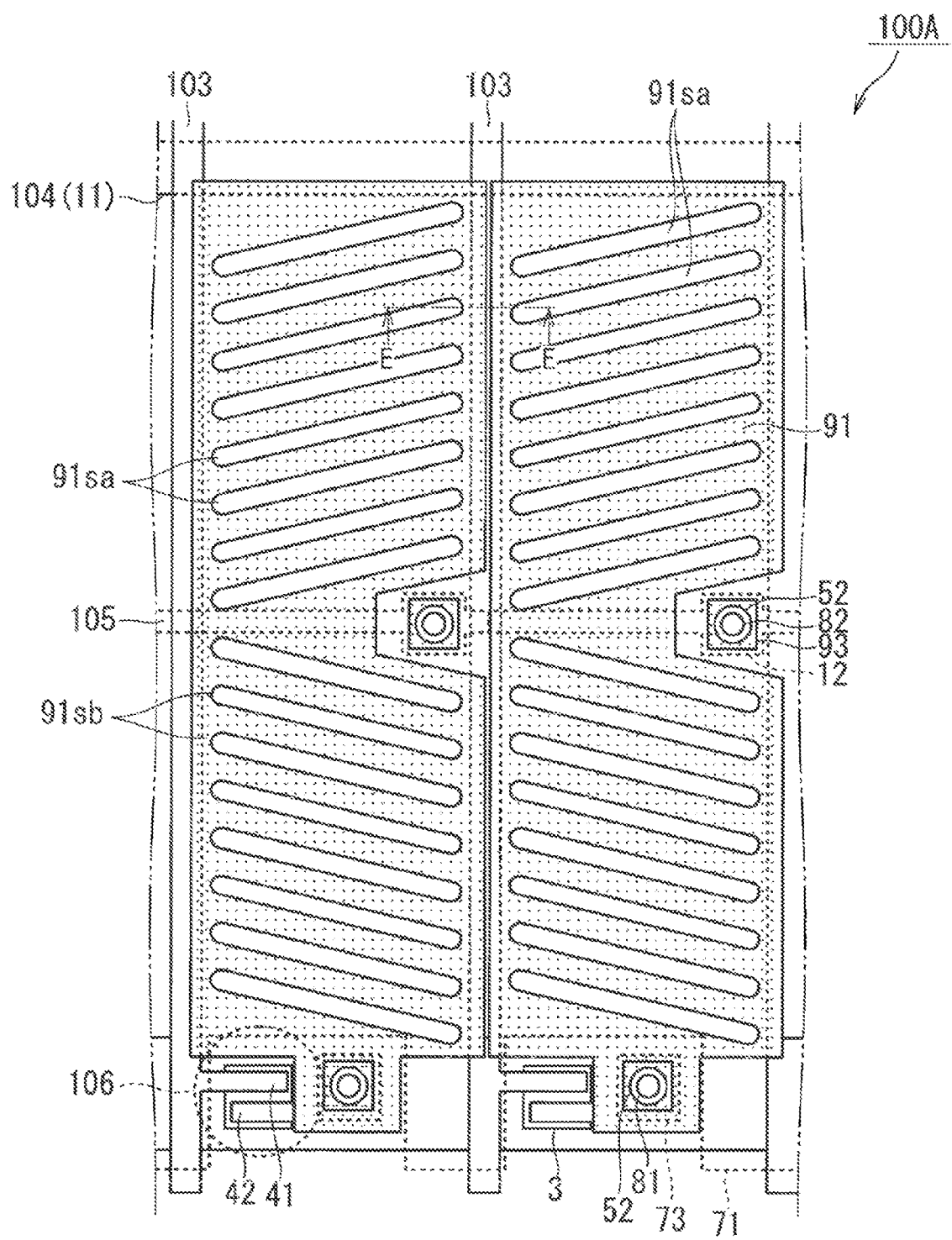
FIG. 9 is a plan view showing the structure of pixel parts formed at a display region of a liquid crystal display panel according to a second preferred embodiment of the present invention.

FIG. 9 is a plan view showing the structure of the pixel part formed in the display region 101 (FIG. 1), showing a TFT array substrate 100A side in which thin-film transistors (TFTs) 106 are arranged in a matrix. Note that the entire structure of the liquid crystal display panel is similar to that of the liquid crystal display panel 1000 shown in FIG. 1.

Figure 10:
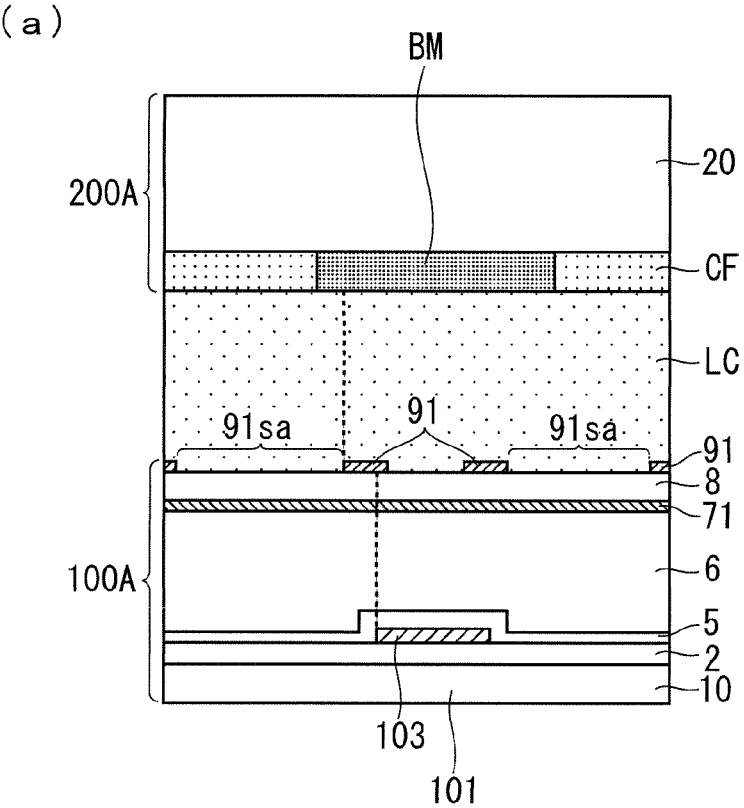
FIG. 10 is a diagram illustrating the arrangement of slits formed at a pixel electrode of the liquid crystal display panel according to the second preferred embodiment of the present invention.
Figure 10:
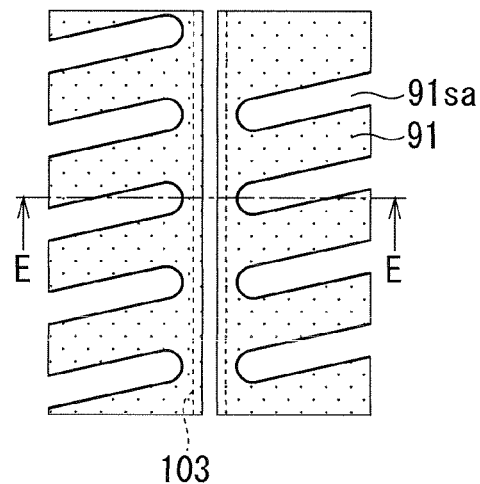

Part (a) of FIG. 10 is a cross-sectional view taken along line E-E viewed in the arrow direction in FIG. 9, showing the cross-sectional view of the TFT array substrate 100A, a color filter substrate 200A arranged to oppose to the TFT array substrate 100A, and a liquid crystal layer LC interposed therebetween. Further, part (b) of FIG. 10 shows an enlarged plan view of the region corresponding to line E-E in FIG. 9.

Figure 11:
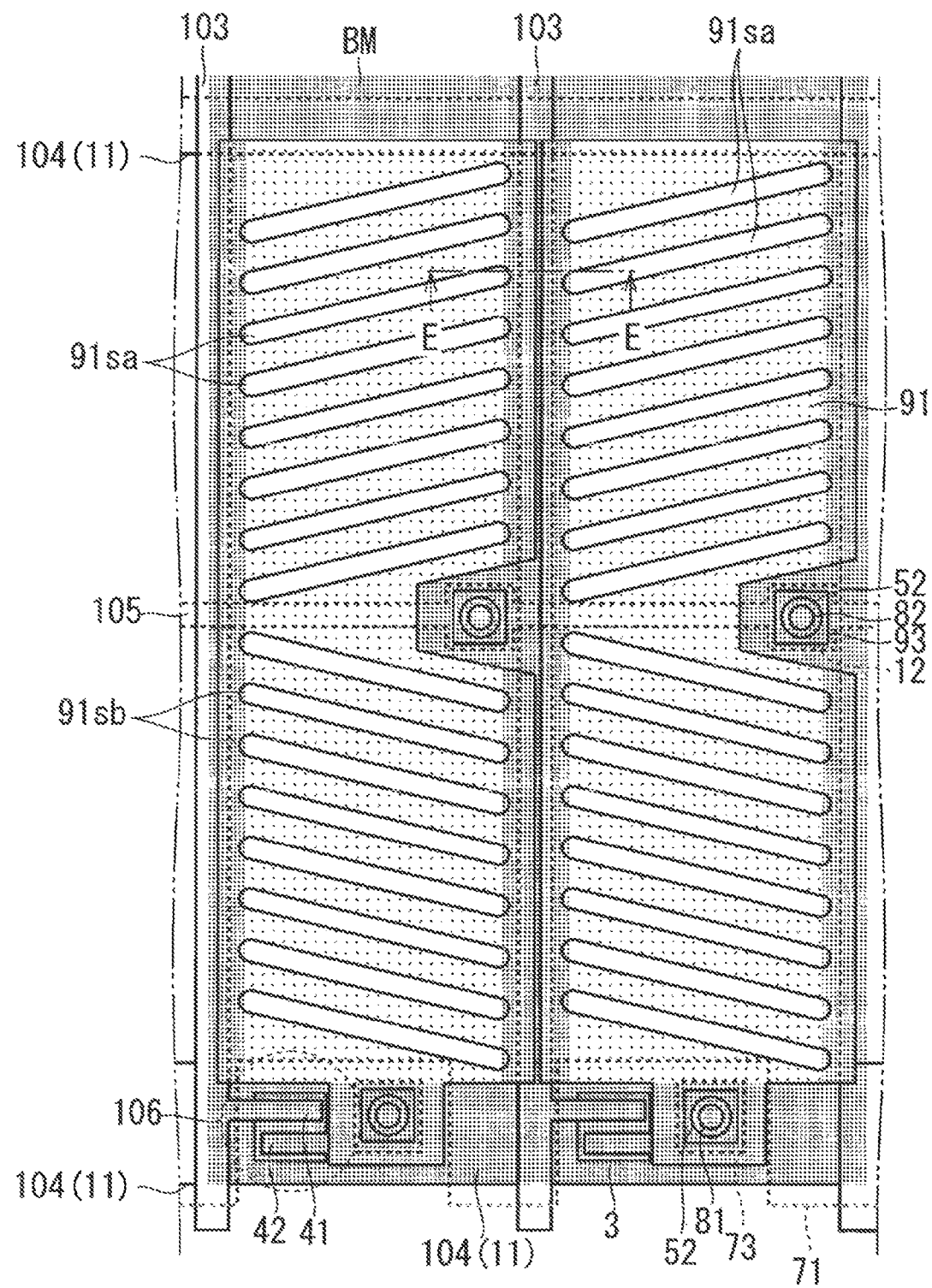
FIG. 11 is a diagram illustrating the arrangement of a black matrix of the liquid crystal display panel according to the second preferred embodiment of the present invention.

Further, FIG. 11 shows the light shield region being the black matrix BM provided to the color filter substrate 200A overlapping the TFT array substrate 100A shown in FIG. 9, the color filter substrate 200A arranged to oppose to the TFT array substrate 100A.

As shown in part (a) of FIG. 10, the TFT array substrate 100A according to the second preferred embodiment is identical to the TFT array substrate 100 according to the first preferred embodiment shown in part (a) of FIG. 5 in that, around the signal line 103, the opposite electrode 71 is formed across adjacent pixels including the signal line 103, and that the pixel electrode 91 is arranged to be overlaid above the signal line 103. That is, the pattern edge portion of the pixel electrode 91 is arranged to be overlaid above one of the edge portions of the signal line 103 arranged between the pixel electrodes 91.

However, as shown in part (a) of FIG. 10, in connection with the slits 91sa and 91sb being the openings formed at the pixel electrode 91, one of the tip portions of a slit is not overlaid above the adjacent signal line 103, only reaching the outside of the edge portion of the signal line 103. Further, while not shown, likewise, the other tip portion of the slit is formed so as not to be overlaid above the adjacent signal line 103.

That is, the slits 91sa and 91sb are each formed to extend between two signal lines 103 which are respectively arranged on the long sides of the pixel electrode 91 so as to sandwich the pixel electrode 91.

Note that, part (b) of FIG. 10 is an enlarged plan view of the region corresponding to line E-E in FIG. 9. Part (a) of FIG. 10 is a cross-sectional view of a region where the slits 91sa are formed, out of the slits 91sa and 91sb being two types of slit-shaped openings. The structure holds true for the region where the slits 91sb are formed, except that the structure becomes upside down in the drawing. Similarly to the slits 91sa, the slits 91sb are formed such that their respective tip portions are not overlaid on the signal lines 103.

In this manner, with the liquid crystal display panel according to the second preferred embodiment, the portion around the tip portions of the slits 91sa and 91sb where irregular alignment of liquid crystal may possibly occur is not shielded against light by the signal line 103, which functions also as a light shield film as in the first preferred embodiment.

Accordingly, as shown in part (a) of FIG. 10, with the liquid crystal display panel according to the second preferred embodiment, by arranging the black matrix BM provided to the color filter substrate 200A to extend to the outside of the opposite edge portions of the signal line 103, a reduction in display quality attributed to irregular alignment around the tip portion of the slits 91sa and 91sb is prevented.

As a result, as shown in FIG. 11, the black matrix BM provided at the color filter substrate 200A is provided to protrude outward in the plane direction from the region where the signal line 103 is arranged.

As has been described in the foregoing, with the liquid crystal display panel according to the second preferred embodiment, the aperture ratio reduces by the amount corresponding to the black matrix BM blocking out light from the irregular alignment region around the edge portions of the slits 91sa and 91sb. However, the pixel electrode 91 is arranged so as to cover the edge portion of the signal line 103. Accordingly, light leakage attributed to the electric field leaking from the signal line 103 can be prevented. Also, the region of the black matrix BM extending to the outside of the opposite edge portions of the signal line 103 can be smaller than that in the conventional liquid crystal display panel.

In an extreme case, instead of forming the black matrix BM of a uniform width as shown in part (b) of FIG. 10 along the signal line 103, the black matrix BM may be formed in a contour shape covering only the tip portions of the slits 91sa and 91sb. In this case, the aperture ratio can approximate that obtained with the liquid crystal display panel according to the first preferred embodiment.

Note that, with the liquid crystal display panel according to the second preferred embodiment also, similarly to the liquid crystal display panel according to the first preferred embodiment, in connection with the liquid crystal display apparatus of the FFS mode, the regions where irregular alignment occurs, such as the region around the signal line and the boundary portion of the slit-shaped openings of two types differing in the tilting direction, are properly shielded from light and hence are prevented from visually recognized. Thus, high display quality can be achieved at the same time.

Further, it goes without saying that the similar function and effect can be obtained also with the structure in which the opposite electrode 71 is formed as an upper layer relative to the pixel electrode 91 and the slit-shaped openings are provided to the opposite electrode 71.

Note that, the preferred embodiments of the present invention can be modified or omitted as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display panel comprising:
first and second substrates,
said first substrate having,
a transparent insulating substrate;
signal lines and scanning lines arranged on a display region on said transparent insulating substrate, the signal lines and the scanning lines crossing each other to form a matrix;
a common line arranged in parallel with said scanning lines;
an insulating film covering said signal lines, said scanning lines and said common line; and
a lower electrode and an upper electrode arranged in a pixel part surrounded by said scanning lines and said signal lines to oppose to each other in an upper and lower positional relationship on said insulating film,
said second substrate being arranged to oppose to said first substrate, wherein
said common line is arranged to cross a center portion of said pixel part,
said pixel part is divided by said common line into first and second regions,
said upper electrode has a slit-shaped first opening in said first region and a slit-shaped second opening in said second region,
said first opening is formed as being tilted, such that the slit forms a first angle with a reference line which is an extending direction of said common line,
said second opening is formed as being tilted, such that the slit forms a second angle line-symmetrically to said first angle with reference to said reference line,
said upper electrode and said lower electrode are arranged to be respectively overlaid on edge portions of said scanning lines and said signal lines, the edge portions existing along extending directions of said scanning lines and said signal lines,
said second substrate includes a light shield film,
said light shield film is formed in a region above a region where said scanning lines and said signal lines are formed in said pixel section, to extend along the region where said scanning lines and signal lines are formed,
in a region where a first contact hole penetrating through at least said insulating film to reach a surface of said common line is formed and a region nearby, said light shield film is formed in a region corresponding to above at least a region extending outward from a top edge portion of the first contact hole,
said light shield film does not extend over an entirety of said common line, and
said light shield film covers ends of said slit-shaped first opening and said slit-shaped second opening on both sides of said pixel part.

2. The liquid crystal display panel according to claim 1, wherein
said insulating film is a planarizing film having a thickness of at least 1 μm, said insulating film planarizing a surface of said first substrate above said signal lines, said scanning lines and said common line.

3. The liquid crystal display panel according to claim 2, wherein
said insulating film includes one of an organic resin film and an SOG film.

4. The liquid crystal display panel according to claim 1, wherein
said first opening is formed such that opposite tip portions of the slit are respectively overlaid above said signal lines defining two opposite sides of said pixel part, and
said second opening is formed such that opposite tip portions of the slit are respectively overlaid above said signal lines defining two opposite sides of said pixel part.

5. The liquid crystal display panel according to claim 1, wherein
said pixel part has a pillar spacer for keeping a distance between said first substrate and said second substrate, said liquid crystal display panel further comprising
a second contact hole provided at a region where said scanning lines are formed, the second contact hole penetrating through at least said insulating film, wherein
said pillar spacer is provided at one of a position above said scanning lines around said second contact hole and a position above said second contact hole.

6. The liquid crystal display panel according to claim 1, wherein
said light shield film is formed in a region above a region where said scanning lines and said signal lines are formed in said pixel section while protruding outward in a plane direction from the region where said scanning lines and said signal lines are formed, to cover the region where said scanning lines and said signal lines are formed and to cover an upper portion of an edge portion of said scanning lines and said signal lines.

7. A liquid crystal display panel comprising:
first and second substrates,
said first substrate having,
a transparent insulating substrate;
signal lines and scanning lines arranged on a display region on said transparent insulating substrate, the signal lines and the scanning lines crossing each other to form a matrix;
a common line arranged in parallel with said scanning lines;
an insulating film covering said signal lines, said scanning lines and said common line; and
a lower electrode and an upper electrode arranged in a pixel part surrounded by said scanning lines and said signal lines to oppose to each other in an upper and lower positional relationship on said insulating film,
said second substrate being arranged to oppose to said first substrate, wherein
said common line is arranged to cross a center portion of said pixel part,
said pixel part is divided by said common line into first and second regions,
said upper electrode has a slit-shaped first opening in said first region and a slit-shaped second opening in said second region,
said first opening is formed as being tilted, such that the slit forms a first angle with a reference line which is an extending direction of said common line,
said second opening is formed as being tilted, such that the slit forms a second angle line-symmetrically to said first angle with reference to said reference line,
said upper electrode and said lower electrode are arranged to be respectively overlaid on edge portions of said scanning lines and said signal lines, the edge portions existing along extending directions of said scanning lines and said signal lines,
said second substrate includes a light shield film,
said light shield film is formed in a region above a region where said scanning lines and said signal lines are formed in said pixel section, to extend along the region where said scanning lines and signal lines are formed, in a region where a first contact hole penetrating through at least said insulating film to reach a surface of said common line is formed and a region nearby, said light shield film is formed in a region corresponding to above at least a region extending outward from a top edge portion of the first contact hole, said light shield film does not extend over an entirety of said common line, said liquid crystal display panel further comprises:
- a liquid crystal layer interposed between said first substrate and said second substrate;
- a biaxial retardation film disposed on a light incident side for said liquid crystal layer;
- a first polarizer arranged externally to said biaxial retardation film; and
- a second polarizer arranged on an opposite side to said first polarizer having said liquid crystal layer interposed therebetween, wherein an alignment direction of said liquid crystal layer is set in a direction parallel to the extending direction of said common line, a slow axis of said biaxial retardation film is set to be in one of a direction parallel to the alignment direction of said liquid crystal layer and a direction perpendicular to the alignment direction of said liquid crystal layer, and one of absorption axes of said first and second polarizers is set to be in a direction parallel to the alignment direction of said liquid crystal layer, while other one of the absorption axes of said first and second polarizers is set to be in a direction perpendicular to the alignment direction of said liquid crystal layer.

8. The liquid crystal display panel according to claim 7, wherein
said light shield film covers ends of said slit-shaped first opening and said slit-shaped second opening on both sides of said pixel part.

9. The liquid crystal display panel according to claim 7, wherein
said light shield film is formed in a region above a region where said scanning lines and said signal lines are formed in said pixel section while protruding outward in a plane direction from the region where said scanning lines and said signal lines are formed, to cover the region where said scanning lines and said signal lines are formed and to cover an upper portion of an edge portion of said scanning lines and said signal lines.

10. The liquid crystal display panel according to claim 7, wherein
said light shield film is formed in a region above a region where said scanning lines and said signal lines are formed in said pixel section, without protruding outward in a plane direction from the region where said scanning lines and said signal lines are formed.

11. The liquid crystal display panel according to claim 7, wherein
said insulating film is a planarizing film having a thickness of at least 1 µm, said insulating film planarizing a surface of said first substrate above said signal lines, said scanning lines and said common line.

12. The liquid crystal display panel according to claim 11, wherein
said insulating film includes one of an organic resin film and an SOG film.

13. The liquid crystal display panel according to claim 7, wherein
said first opening is formed such that opposite tip portions of the slit are respectively overlaid above said signal lines defining two opposite sides of said pixel part, and
said second opening is formed such that opposite tip portions of the slit are respectively overlaid above said signal lines defining two opposite sides of said pixel part.

* * * * *